United States Patent [19]
Wraight

[11] Patent Number: 4,845,359
[45] Date of Patent: Jul. 4, 1989

[54] METHODS AND APPARATUS FOR SAFELY HANDLING RADIOACTIVE SOURCES IN MEASURING-WHILE-DRILLING TOOLS

[75] Inventor: Peter D. Wraight, Missouri City, Tex.

[73] Assignee: Schlumberger Technology Corporation, Houston, Tex.

[21] Appl. No.: 124,713

[22] Filed: Nov. 24, 1987

[51] Int. Cl.[4] .......... G01V 5/00; G21F 5/02
[52] U.S. Cl. .......... 250/254; 250/497.1
[58] Field of Search .......... 250/254, 496.1, 497.1

[56] References Cited

U.S. PATENT DOCUMENTS

| | | | |
|---|---|---|---|
| 2,986,639 | 5/1961 | Josendal et al. . | |
| 3,071,689 | 1/1963 | Scherbatskoy . | |
| 3,255,353 | 6/1966 | Scherbatskoy . | |
| 3,256,434 | 6/1966 | Carver et al. | 250/497.1 |
| 3,321,625 | 5/1967 | Wahl . | |
| 3,321,627 | 5/1967 | Tittle . | |
| 3,521,065 | 7/1970 | Locke . | |
| 4,006,777 | 2/1977 | LaBauve | 166/250 |
| 4,048,495 | 9/1977 | Ellis | 250/264 |
| 4,392,377 | 7/1983 | Rankin | 250/254 |
| 4,412,130 | 10/1983 | Winters | 250/260 |
| 4,468,762 | 8/1984 | Jurgens | 367/83 |
| 4,492,865 | 1/1985 | Murphy et al. | 250/265 |
| 4,520,468 | 5/1985 | Scherbatskoy | 367/83 |
| 4,524,279 | 6/1985 | Christianson et al. | 250/497.1 |
| 4,550,392 | 10/1985 | Mumby | 367/82 |
| 4,596,926 | 6/1986 | Coope | 250/265 |
| 4,698,501 | 10/1987 | Paske | 250/265 |
| 4,705,944 | 11/1987 | Coope | 250/254 |

FOREIGN PATENT DOCUMENTS

| | | |
|---|---|---|
| 2175085 | 11/1986 | United Kingdom . |
| 2183831 | 6/1987 | United Kingdom . |

OTHER PUBLICATIONS

Koopersmith & Barnett, "Environmental Parameters Affecting Neutron Porosity, Gamma Ray, and Resistivity Mesurements Made While Drilling", SPE 16758, Sep. 1987.
Paske, Roesler, Barnett & Rodney, "Formation Density Logging While Drilling", SPE 16756, Sep. 1987.
Roesler, Barnett & Paske, "Theory & Application of a Measurement-While-Drilling Neutron Porosity Sensor", SPE/IADC 16057, Mar. 1987.

*Primary Examiner*—Bruce C. Anderson
*Attorney, Agent, or Firm*—Stephen L. Borst

[57] ABSTRACT

A method for moving a radioactive source into and out of a well logging tool incorporated in the drill string is disclosed. Prior to moving the source, the logging tool is positioned sufficiently distant from and vertically under the drilling rig floor so as to avoid a hazardous radiation condition at the floor when the source is in its operative position in the tool. A tubular radiation shield containing the source is positioned at the end of the drill string hanging from the rotary table and a source manipulating device is engaged with the source. It is then lowered through the shield and the drill string into the tool. These steps are practiced in the reverse order when the source is being removed from the tool. An additional shield may be provided to envelop the first shield for added shielding during transportation or storage.

38 Claims, 2 Drawing Sheets

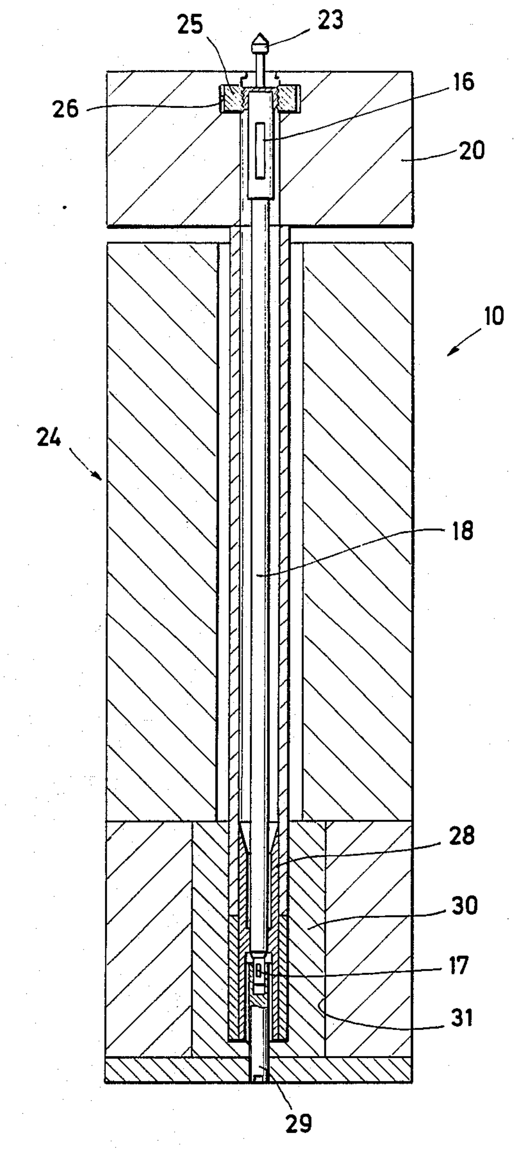
FIG. 3
FIG. 4
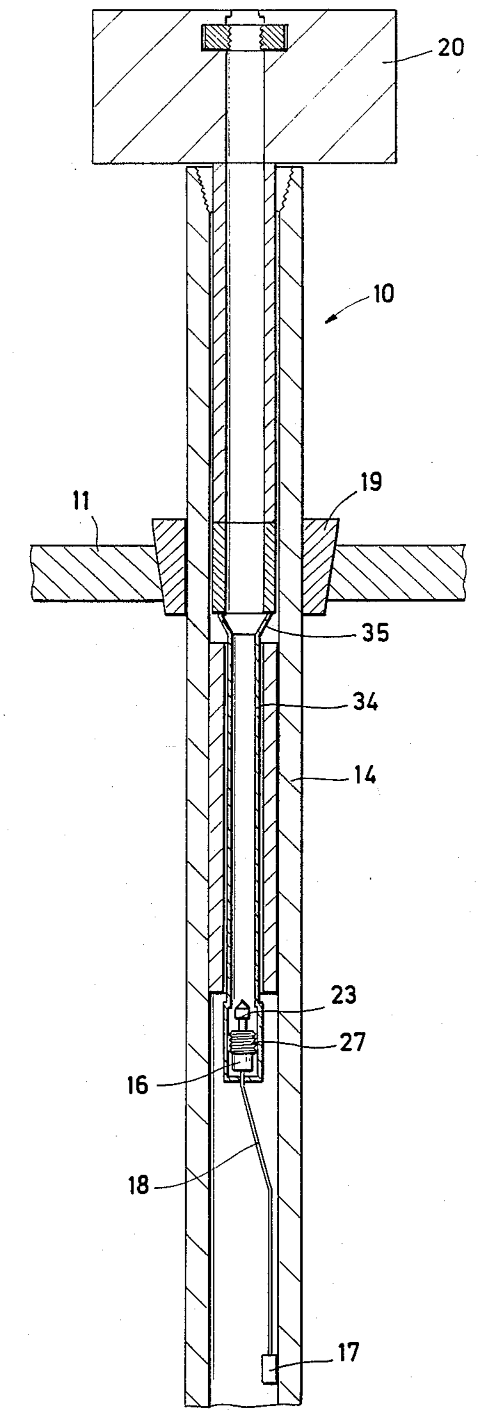

METHODS AND APPARATUS FOR SAFELY HANDLING RADIOACTIVE SOURCES IN MEASURING-WHILE-DRILLING TOOLS

BACKGROUND OF THE INVENTION

During the drilling of an oil or gas well successive measurements are made of various characteristics or properties of the earth formations being penetrated by the drill bit while it progressively excavates the borehole. Heretofore the majority of these measurements could not be made without discontinuing the drilling operation and removing the drill string and drill bit from the borehole long enough to enable typical wireline logging operations to be conducted in the open borehole. With the introduction of measuring-while-drilling or so-called "MWD" tools into commercial service, it has become feasible to successively measure various formation properties and characteristics as the borehole is being drilled and to transmit real-time signals representative of these measurements through the mud stream flowing in the drill string to appropriate detecting-and-recording equipment located at the surface.

Among the more-important open hole logging measurements are those characteristics of the earth formations which may be measured by techniques which utilize radiation. Inasmuch as measurements of the natural gamma radiation from the formations require only a gamma-ray detector and typical electronic circuits for controlling the MWD signaler, it has not been particularly difficult to make these measurements by the instrumentation in a MWD tool. Typical MWD tools that have this capability are shown, for example, in FIG. 4 of U.S. Pat. No. 3,255,353. On the other hand, as depicted in FIG. 1 of that patent, if other radioactivity characteristics of formations are to measured, the MWD tool must also carry a suitable radiation source such as a typical radioactive chemical source. Since the measurement of formation density is significantly influenced by borehole fluids, as described in U.S. Pat. No. 4,596,926 it has been proposed to compensate for the borehole fluids by arranging an array of radioactive sources and radiation detectors around the tool body.

There is, of course, always a risk that a MWD tool will become inadvertently stuck in the borehole during the course of a typical drilling operation. Should the MWD tool or drill string become seriously stuck, it may be necessary to remove as much of the drill string from the borehole as is possible and then employ appropriate "fishing" techniques to recover the remaining portion of the drill string as well as the MWD tool and the drill bit from the borehole before the drilling operation can be resumed. Such fishing operations may, however, impose such severe impacts on the MWD tool that its inner components could be seriously damaged before the tool can be recovered. Thus, should a MWD tool become stuck in a borehole, it is desirable to recover as much of the tool as is possible before starting the fishing procedures.

Whenever radioactive materials are used, it is essential to adopt procedures and design equipment that prevents the exposure of personnel on the rig floor during the routine installation and removal of sources used in the MWD tool. Additionally, whenever the source is arranged in a tool body immediately above the drill bit such as with the MWD tool depicted in U.S. Pat. No. 3,255,353, the removal and replacement of the bit could pose unnecessary exposure to rig personnel due to the proximity of the source unless special precautions are taken. With that arrangement, at least the lower portion of the MWD tool is suspended in the derrick while the drill bit is being uncoupled from the tool body carrying the source or while the radioactive source is being removed from the source chamber prior to the removal of the bit. This procedure must, of course, be reversed whenever the source is being installed into the MWD tool. Thus, whenever this prior-art tool is out of the borehole, it is quite difficult to protect the workers on the rig floor so long as the radioactive source is not safely enclosed in a shield. Accordingly, the periodic assembly and disassembly of the tool and the drill bit will subject the workers on the rig floor so long as the radioactive source is not safely enclosed in a shield. Accordingly, the periodic assembly and disassembly of the tool and the drill bit will subject the workers on the rig floor to exposures to radiation which are best avoided. Potential exposure is correspondingly increased whenever unexpected problems or delays in the assembly or disassembly of the MWD tool or drill bit occur or when an event occurs which requires some of the workers to work closer to the tool than would otherwise be necessary.

Even greater difficulties are presented with a MWD tool having a plurality of circumferential radioactive sources in the wall of a tool body such as shown in U.S. Pat. No. 4,596,926. For one thing, the radioactive sources in such a tool are mounted in lateral chambers that are closed by threaded port plugs. As a result, each time that the tool is removed from a borehole, the tool body carrying the sources will be caked with a thick layer of a gummy mudcake that must be scraped or washed off before the port plugs can be removed. With several sources to be removed, it will require a significant amount of time to locate the several port plugs, to disengage safety locking features designed to prevent inadvertent loss of the source while the borehole is being drilled, to remove the plugs and sources and to place the sources into suitable shielded source carriers. A similar amount of time will be required to reinstall the several sources into their respective source chambers when the MWD tool is being readied for service. Moreover, the continuous abrasion of the tool string against the borehole wall during a drilling operation may damage the external surfaces of the tool body around the entrance to a source chamber to such an extent that it may become difficult to remove the port plug. Should this occur, the workers will be compelled to remain close to the tool body for extended periods of time in order to remove the port plugs and the sources.

OBJECTS OF THE INVENTION

Accordingly, it is an object of the present invention to provide new and improved methods and protective apparatus for safely installing and removing a radioactive source employed in a MWD tool.

It is a further object of the invention to provide new and improved safety methods and apparatus adapted for handling radioactive chemical sources removably mounted in a MWD tool.

It is yet another object of the invention to provide new and improved safe-handling methods and apparatus for the quick and clean installation and removal of a radioactive source mounted in a MWD tool in such a manner that personnel on the drilling rig are exposed as little as is reasonably possible to the radiation emitted by the source.

SUMMARY OF THE INVENTION

These and other objects of the present invention are attained in the practice of new and improved methods with the apparatus of the described invention by raising a string of drill pipe out of a borehold and successively removing joints of pipe therefrom until a MWD tool dependently coupled to the lower end of the pipe string is positioned below the drilling rig so as to locate a radioactive source releasably mounted in the MWD tool at a safe working distance from workers on the rig floor. Removal of the drill string is then halted and a tubular radiation shield is positioned at the top of the remaining drill string for receiving the source. Once the shield has been positioned, the source is moved from its usual operating position in the MWD tool to a transport position in the radiation shield. The shield and source are then lifted from the top of the drill string and brought to the rig floor where additional radiation shielding is disposed around the source. Once the source is safely shielded, the operator then has the alternative of either leaving the shielded source on the rig floor to await subsequent logging operations or removing the shielded source from the drilling rig or removing the sources individually from the shield and placing in individual shields for storage or transportation.

BRIEF DESCRIPTION OF THE DRAWINGS

The novel features of the present invention are set forth with particularity in the appended claims. The invention, together with further objects and advantages thereof, may best be understood by way of illustration of the following description of exemplary methods and apparatus employing the principles of the invention as illustrated in the accompanying drawings in which:

FIGS. 2–4 are successive views showing a preferred manner of practicing the new and improved methods of the present invention with the new and improved source-handling apparatus seen in FIG. 1.

DETAILED DESCRIPTION OF THE INVENTION

Figure 1:
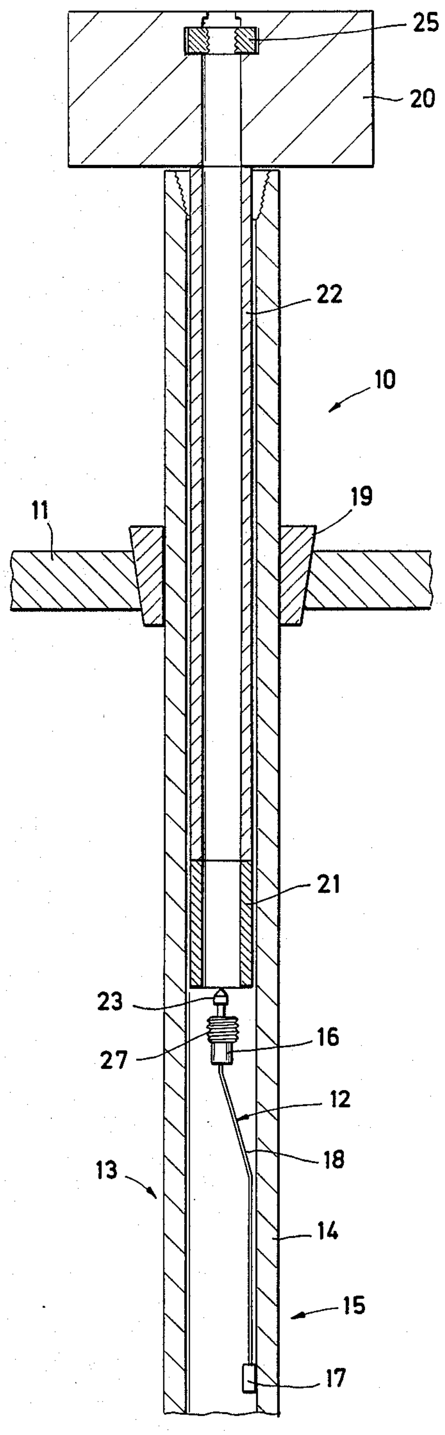
FIG. 1 illustrates a preferred embodiment of the new and improved source-handling apparatus of the invention as this apparatus may be employed on a drilling rig for safely loading and unloading one or more chemical radioactive sources into and out of a MWD tool.

Turning now to FIG. 1, the inner portion of a preferred embodiment of new and improved source-handling apparatus 10 arranged in accordance with the principles of the present invention is depicted as this inner portion of the apparatus will appear when it has been positioned on the floor of a drilling rig 11 to recover a retrievable source carrier 12 from radioactivity-logging means 13 arranged in the upper tubular body 14 of a MWD tool 15. As is typical, the MWD tool 15 is made up as part of and is tandemly coupled in a tubular drill string having a drill bit at its lower end. During the course of the drilling operation, a suitable fluid such as a so-called "drilling mud" is continuously pumped through the drill string and discharged into the borehole through the bit for cooling the bit and for transporting the drill cuttings removed from the formation by the bit to the surface on the outside of the drill string.

The MWD tool 15 is preferably arranged as disclosed in U.S. Pat. No. 4,479,564. As fully described in that patent, the MWD tool 15 includes an assembly of thick-walled tubular bodies, such as the upper body 14, which are tandemly coupled together and arranged to enclose a plurality of sensors and their related circuitry. The preferred embodiment of the MWD tool 15 also includes an acoustic signaler (not illustrated) which is cooperatively arranged in the tool 14 for receiving the output signals from the sensors in the radioactivity-logging means 13 and the other sensors in the MWD tool. The signaler transmits encoded data signals representative of the output signals of the sensors through the flowing stream of drilling mud to the surface where they are detected and processed by surface equipment (not illustrated).

Although the present invention can be practiced with a MWD tool employing only a single source, the retrievable source carrier 12 of the radioactivity-logging means 13 is illustrated as comprising upper and lower sources 16 and 17 that are tandemly interconnected by a flexible elongated body. This body may be a cable 18 to facilitate moving the source carrier into and out of the tool body 14. For reasons that will subsequently become apparent, it is preferred that the upper radiation source 16 is a large chemical neutron source such as americium beryllium and that the lower radiation source 17 is a smaller chemical source of gamma ray energy such as radioactive cobaltor cesium.

Whenever in the normal course of drilling it is decided that the retrievable carrier 12 is to be removed from the MWD tool 15, the drilling operation is halted and the tool is then progressively raised out of the borehole below the drilling rig 11 by successively uncoupling and removing the multiple joints of drill pipe comprising the drill string. Once the upper end of the tool body 14 has reached the floor of the rig 11, a set of typical pipe slips 19 is positioned as shown in FIG. 1 to dependently suspend the MWD tool 15 in an upright position below the rig floor so that the retrievable carrier 12 can be removed from the tool body.

Before the retrievable source carrier 12 can be removed from the tool body 14, the axial bore of the body must first be cleared of obstructions such as a debris screen (not illustrated) that may be disposed therein above the source carrier. Typically the removal of such screens is carried out by using a so-called "sand line" on the drilling rig 11 for lowering a typical grapple into the tool body 14 until it is coupled to a fishing neck on the screen so that the screen can then be lifted out of the tool body. So long as the upper tool body 14 is supported in its depicted position, the MWD tool 15 will be suspended within the piping and other equipment (not illustrated) that is below the floor of the rig. This equipment will itself provide some degree of additional shielding of the sources 16 and 17. Moreover, since the sources 16 and 17 are maintained at a safe working distance below the floor of the rig 11 at this stage of the removal process, there is little hazard so long as the personnel on the rig floor stay away from the open end of the upper tool body.

Once the axial bore of the tool body 14 has been cleared, the inner portion of the source-handling apparatus 10 is then mounted on the upper portion of the tool body 14. In this position, it is ready to receive the retrievable source carrier 12 directly from the MWD tool 15. To accommodate the source carrier 12 with its upper and lower sources 16 and 17, the inner portion of the source-handling apparatus 10 includes tubular upper and lower radiation shields 20 and 21 that are tandemly coupled by a tubular intermediate member 22 of sufficient length to properly locate the upper and lower shields for respectively receiving the upper and lower shields when the carrier 12 is within the source handling apparatus. If the neutron source is the topmost source, the upper shield 20 must be of such a large physical size that it will be incapable of insertion into the top of the tool body 14. Both the lower and intermediate radiation shields 21 and 22 may, however, be sized so that they can be accommodated within the upper body 14 of the MWD tool 15.

Figure 2:
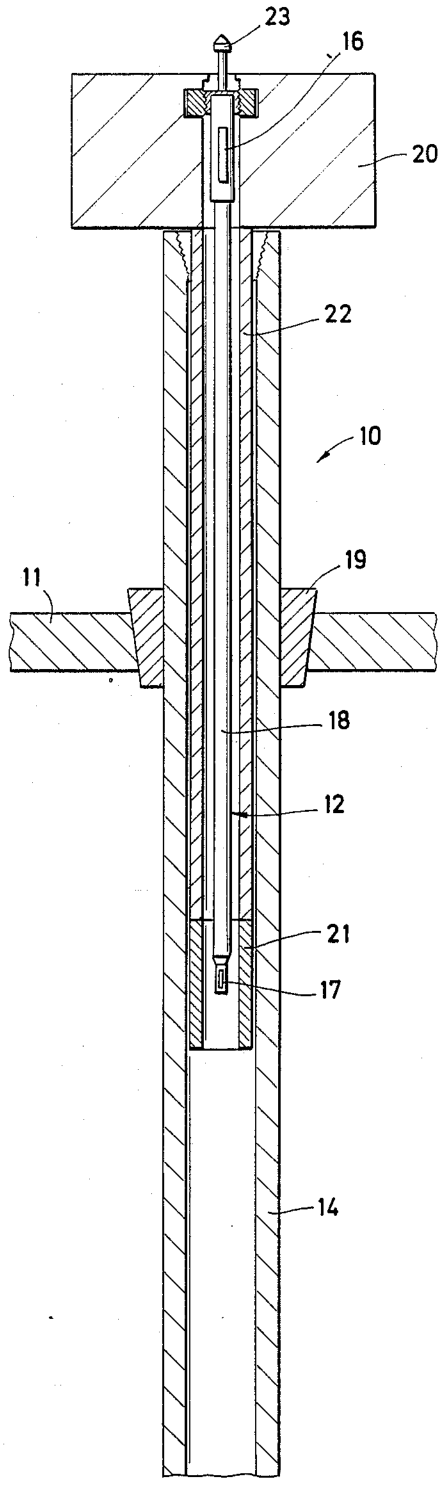

Turning now to FIG. 2, it will be seen that once the radiation shields 20–22 have been mounted on the upper end of the tubular body 14, the retrievable carrier 12 can then be elevated into its depicted position in the inner assembly of the source-handling apparatus 10. By arranging the carrier with a typical fishing neck 23 on its upper end, after a suitable retaining mechanism has been released the retrievable carrier 12 can be recovered by using the sand line on the rig 11 to lower a suitable grapple (not illustrated) through the aligned axial bores of the radiation shields 20–22 and on into the tool body 14 until the grapple is coupled with the fishing neck. The sand line is then operated as required for lifting the carrier 12 out of the tool body 14 and into the position depicted in FIG. 2 where the sources 16 and 17 are respectively disposed in the upper and lower radiation shields 20 and 21. Continued raising of the sand line will then lift the shielding device along with the enclosed and shielded sources off of the tool body 14 for further safe handling. Alternatively, the shield itself may be engaged with a lifting device for lifting off of the tool body. Then, as shown in FIG. 3, the entire assembly is moved aside for ultimate disposition within an outer transportation/storage shield assembly 24 which is the outer portion of the source-handling apparatus 10 and cooperatively arranged for providing enhanced shielding while the sources await the completion of other operations such as changing the bit or for transportation to and from the well site. It will, of course, be appreciated that while the course carrier 12 and the inner radiation shields 20–22 are being moved into the outer shield assembly 24, the carrier must be secured within the inner shields. Accordingly, in the preferred manner of securing the carrier 12, the source-handling apparatus 10 further includes latching means such as a split nut 25 which is loosely mounted in an inwardly-opening recess 26 in the upper portion of the axial bore in the shield 20 and cooperatively arranged for threadingly engaging complemental external threads 27 on the fishing neck 23 as the source carrier is raised into its elevated position shown in FIGS. 2 and 3.

As illustrated in FIG. 3, the new and improved source-handling apparatus 10 also includes a tubular tungsten shield 28 that is adapted to be fitted around the lower shield 21 to enhance the shielding around the source 17 before the inner portion of the source-handling apparatus is placed into the outer shield assembly 24. A tungsten plug 29 is adapted to be inserted into the lower end of the axial bore of the lower shield 21 as the inner shields 20–22 are being raised from the tool body 14 for placement in the outer shield assembly 24. Assembly 24 has an additional tubular radiation shield 30 which is preferably formed of lead and is cooperatively arranged within the axial bore 31 of the outer shield assembly to receive the lower source 17 once the inner shields 20–22, the shield 28, the plug 29 and the retrievable source carrier 12 are removed from the tool body 14 and installed within the outer shield assembly.

It will be further appreciated that the source-handling apparatus 10 can be effectively arranged with the outer shield 24 being an integral body so that the inner shields 20–22 must first be lifted over the top of the outer shield and then lowered into its axial bore 31. On the other hand, in the preferred manner of arranging the source-handling apparatus 10, the outer shield assembly 24 is formed of two mating half cylinders that are longitudinally divided and hinged together whereby the mating half cylinders can be readily swung apart at least far enough for the inner shields 20–22 to be moved laterally into the axial bore 31. Once the inner shields 20–22 are in the outer shield 24, the operator will have the option of either leaving the retrievable source carrier 12 intact inside of the new and improved source-handling apparatus 10 or removing one or both of the radiation sources 16 and 17. The choice will, of course, depend entirely upon various factors outside of the scope of the invention such as, for example, whether or not it is anticipated that the source carrier 12 is to be quickly reinstalled into the MWD tool 15. If so, it may be considered advisable to simply leave the carrier 12 inside of the source-handling apparatus 10 so as to minimize the handling of the sources 16 and 17. On the other hand, if it is likely that the radioactivity-logging means 13 will not be used for some time, it may be considered advisable to move one or both of the sources 16 and 17 into more-appropriate transport carriers (not illustrated). Moving of the sources 16 and 17 requires, of course, appropriate handling devices (not illustrated) which are outside of the scope of the present invention for uncoupling the sources from the cable 18 and then placing the sources into their respective transport carriers.

Turning now to FIG. 4, the new and improved source-handling apparatus 10 of the present invention is depicted as it will be preferably positioned when the retrievable source carrier 12 is to be reinstalled in the upper tool body 14. It will, of course, be recognized that if the upper and lower sources 16 and 17 were to be coaxially disposed within the tool body 14, it is quite likely that the installation of the retrievable carrier 12 can be easily accomplished by simply lowering the source carrier back into the tool body until the sources are again relocated in their respective operating positions. On the other hand, it is preferred to arrange the radioactivity-logging means 13 with the neutron source 16 being coaxially positioned in the tool body 14 and the gamma source 17 being eccentrically positioned therein. This arrangement is accomplished by employing the flexible cable 18 to interconnect the sources 16 and 17 and thereby facilitate the movement of the gamma source to its offset position within the tool body 14.

Accordingly, to accommodate the radioactivity-logging means 13, in the preferred embodiment of the source-handling apparatus 10 of the present invention, an elongated tube or guide member 34 is cooperatively arranged to be temporarily disposed within the upper end of the tool body 14 and coaxially positioned therein to facilitate the movement of the source carrier 12 as it is lowered into its operating position in the upper portion of the tool body. An upwardly-diverging funnel 35 is arranged on the upper end of the guide member 34 to direct the retrievable source carrier 12 into the tubular guide and on into the aligned longitudinal passages (not illustrated) in the tool body 14 that are adapted to guide the source carrier to its operating position within the tool body.

Accordingly, as seen in FIG. 4 when practicing the present invention to install the source carrier 12, the inner radiation shields 20–22 with the carrier therein are removed from the outer radiation shield 24 and mounted on the tool body 14. Although the guide member 34 can be separately placed in the tool body 14, the tubular guide can also be tandemly coupled to the lower end of the lower shield 21 so that the guide will be put in at the same time that the inner shield members 20–22 are mounted on the tool body. In either case, once the shields 20–22 have been correctly positioned on the tool body 14, a suitable tool (not illustrated) is then lowered into the radiation shields and releasably coupled with the fishing neck 23 to carry the source carrier 12 on through the tubular guide 34 and into its operating position in the MWD tool 15.

Once the source carrier 12 is correctly positioned in the MWD tool 15, the handling tool that was used for moving the carrier into position is then withdrawn from the tool body 14 and the radiation shields 20–22. Since the source carrier 12 is positioned in the equipment below the floor of the drilling rig 11, the personnel on the rig floor will ordinarily be at a safe working distance from the sources 16 and 17. Thus, the inner shields 20–22 can be withdrawn from the body 14 without the sources 16 and 17 representing a substantial radiation hazard for the workers on the rig 11. Once the radiation shields 20–22 are removed from the tool body 14, the MWD tool 15 can be readied for service in the borehole and the first section of drill string can be recoupled to the tool body to progressively lower the tool into the borehole.

It should be recognized that although the preceding description of the source-handling apparatus 10 has been directed to its use after the MWD tool 15 have been returned to the floor of the rig 11, the same procedure can be employed should it be desired to remove the retrievable source carrier 12 without returning the MWD tool to the surface. For instance, during a drilling operation it may be decided to remove the retrievable source carrier 12 before drilling further. Alternatively, it may be determined that the MWD tool 15 or some portion of the drill string is stuck in the borehole and it is considered advisable to remove the retrievable source carrier 12 before attempting to correct the condition. In any event, the same techniques set out in the previous description of the operation for recovering the source carrier 12 from the upper end of the tool body 14 would be followed except that it would be the upper end of one joint of the drill pipe that would be suspended in the slips 19 on the floor of the drilling rig 14. It would, of course, be necessary to first remove any impediment such as a debris screen in the MWD tool 15 by lowering a grapple on the sand line on into the drill string until it is latched onto the fishing neck on the screen.

Accordingly, in keeping with the objects of the present invention, it will be appreciated that by positioning the source-handling apparatus 10 of the invention on a MWD tool, such as shown at 15, carrying one or more radiation sources, as at 16 and 17, while either the tool or a joint of the drill string is dependently supported below the floor of a drilling rig, these sources can be readily moved into and out of the MWD tool without presenting a substantial radiation hazard to personnel on the rig floor. By providing a set of inner radiation shields, as at 20–22, once it is desired to return the radioactivity-logging means 13 to the surface, the drilling operation is discontinued and the multiple stands of pipe in the drill string are progressively uncoupled to bring the tool body carrying the radiation sources 16 and 17 to the surface. Once the tool body 14 is returned to the surface, it is held in an upright position where the sources are accessible from the rig floor but are at a safe working distance therebelow so that the inner shields 20–22 can be set into place with little or no radiation hazard to the personnel on the rig floor. In this manner, personnel on the rig floor will be substantially protected by the inner shields as the radiation sources 16 and 17 are subsequently moved into or out of the shields. It will, of course, be recognized that the inner radiation shields 20–22 can be arranged as necessary should there be only a single source in the retrievable source carrier 12.

While only a single embodiment of the present invention and one mode of practicing the invention have been described and illustrated herein, it is apparent that various modifications and changes may be made without department from the principles of the present invention in its broader aspects; and, therefore, the aim in the appended claims is to cover all such modifications and changes that may fall within the true spirit and scope of this invention.

What is claimed is:

1. A method for removing a chemical radioactive source from a MWD tool which is coupled in a drill string supported by a drilling rig while a borehole is drilled and includes logging means for measuring formation characteristics in response to irradiation of the adjacent formations by the radioactive source during the drilling operation and comprising the steps of:

halting the drilling operation and then removing the drill string from the borehole for moving the MWD tool to a work station at the surface where the source is at a safe working distance from the drilling rig and will be accessible by way of one end of the MWD tool;

positioning a radiation shield at a location adjacent to said one end of the MWD tool where the shield is ready for receiving the source as it is moved away from the other end of the MWD tool and then moving the source away from said other end of the MWD tool for enclosing the source within the shield; and once the source is enclosed within the shield; removing the shield together with the enclosed source from the MWD tool for transferring the enclosed source to another work station.

2. The method of claim 1 where said location is in the interior of the MWD tool so that moving the source away from said other end of the MWD tool encloses the source within the shield before they are removed from the interior of the MWD tool by way of its said one end.

3. The method of claim 1 where said location is on said one end of the MWD tool so that moving the source away from said other end of the MWD tool encloses the source within the shield as the source is removed from the interior of the MWD tool by way of its said one end.

4. The method of claim 1 further including the step of:

after removing the shield and source from the MWD tool, enclosing at least the source in another radiation shield for shielding the source while it is out of the MWD tool.

5. The method of claim 1 further including the step of:

after removing the shield and source from the MWD tool, enclosing the shield and source in another radiation shield for increasing the shielding around the source while it is out of the MWD tool.

6. The method of claim 1 further including the steps of:

subsequent to the removal of the shield and source from the MWD tool, repositioning the shield and source at said location and then moving the source out of the shield toward said other end of the MWD tool for reinstalling the source in the MWD tool; and once the source has been reinstalled in the MWD tool, removing the shield from the MWD tool.

7. The method of claim 1 wherein said one end of the MWD tool is its upper end so that by returning the MWD tool to a work station at the surface where the lower end of the MWD tool is below the drilling rig, the source will be at a safe working distance from said drilling rig and accessible by way of said upper end of the MWD tool after the drill string is uncoupled from the MWD tool.

8. The method of claim 7 wherein said location is on said upper end of the MWD tool so that whenever the shield is positioned on said upper end of the MWD tool, moving the source away from said lower end of the MWD tool will progressively enclose the source within the shield as the source is being moved out of said upper end of the MWD tool and on into the shield.

9. The method of claim 8 further including the steps of:

subsequent to the removal of the shield and enclosed source from the MWD tool, repositioning the shield and enclosed source on said upper end of the MWD tool and then moving the source out of the shield toward said lower end of the MWD tool for reinstalling the source in the MWD tool; and once the source has been reinstalled in the MWD tool, removing the shield from said upper end of the MWD tool.

10. The method of claim 7 wherein said location is inside of the MWD tool so that whenever the shield is positioned within the MWD tool, moving the source away from said lower end of the MWD tool will enclose the source within the shield before the shield and enclosed source are subsequently moved out of said upper end of the MWD tool.

11. A method for handling a chemical radioactive source used in a MWD tool adapted to be coupled in a drill string supported by a drilling rig while drilling a borehole for measuring formation characteristics upon irradiation of the adjacent formations by the source and comprising the steps of:

positioning a radiation shield carrying an enclosed radioactive source adjacent to one end of the MWD tool and moving the source out of the shield for installing the source in the interior of the MWD tool;

once the source has been installed in the interior of the MWD tool, removing the shield from the MWD tool;

coupling the MWD tool to a pipe joint and during the course of a drilling operation progressively assembling a tandemly-coupled drill string for lowering the MWD tool into the borehole;

halting the drilling operation and progressively disassembling the drill string for removing the MWD tool from the borehole to a location at the surface where the source is at a safe working distance from the drilling rig and accessible therefrom by way of said one end of the MWD tool;

whenever the MWD tool is at its said location, repositioning the shield adjacent to said one end of the MWD tool and moving the source from the interior of the MWD tool into the shield; and removing the shield and enclosed source from said one end of the MWD tool and moving the shield and enclosed source to another location away from the MWD tool.

12. The method of claim 11 where the shield is positioned in the interior of the MWD tool so that the shield encloses the source as it is moved into and out of the interior of the MWD tool.

13. The method of claim 11 where the shield is positioned on said one end of the MWD tool so that the shield encloses the source until it is moved into and out of the interior of the MWD tool.

14. The method of claim 11 further including the step of:

after removing the shield and source from the MWD tool, enclosing at least the source in another radiation shield for shielding the source while it is out of the MWD tool.

15. The method of claim 11 wherein said one end of the MWD tool is its upper end so that by returning the MWD tool to a location at the surface where the lower end of the MWD tool is below the drilling rig, the source will be at a safe working distance from said drilling rig and accessible by way of said upper end of the MWD tool after the drill string is uncoupled from the MWD tool.

16. A method for removing tandemly-coupled upper and lower chemical radioactive sources from a MWD tool which is coupled in a drill string during the drilling of a borehole and includes means for measuring formation characteristics in response to the irradiation of adjacent formations by the radioactive sources during the drilling operation and comprising the steps of:

halting the drilling operation and then removing the drill string from the borehole for returning the MWD tool to the drilling rig supporting the drill string and MWD tool;

securing the MWD tool in a position on the drilling rig where the radioactive sources will be maintained at a safe working distance from the drilling rig as well as accessible by way of the upper end of the MWD tool after the drill string has been uncoupled and moved away from the MWD tool;

respectively arranging upper and lower tubular radiation shields on the upper end of the MWD tool and within the interior thereof for positioning the radiation shields to receive the radioactive sources as they are moved toward the upper end of the MWD tool;

moving the radioactive sources toward the upper end of the MWD tool for enclosing the upper and lower radioactive sources within the upper and lower radiation shields respectively; and once the radioactive sources are enclosed in their respective radiation shields, removing the radiation shields and radioactive sources from the MWD tool.

17. The method of claim 16 further including the step of:

after the radiation shields and radioactive sources are removed from the MWD tool, placing at least the lower radiation shield into another radiation shield for increasing the shielding around the radioactive source in the lower radiation shield.

18. The method of claim 17 further including the steps of:

positioning a tubular guide member inside of the MWD tool for guiding the radioactive sources to their respective operating positions within the MWD tool;

returning the upper and lower radiation shields to the upper end of the MWD tool as well as within the MWD tool above the tubular guide member for respectively positioning the radiation shields to reinstall the radioactive sources within the MWD tool;

moving the radioactive sources out of the radiation shields and through the tubular guide member for reinstalling the radioactive sources in their respective operating positions within the MWD tool;

once the radioactive sources have been removed from the MWD tool, removing the upper and lower radiation shields from the upper end of the MWD tool; and after the radiation shields have been removed from the MWD tool, removing the tubular guide member from within the MWD tool.

19. The method of claim 17 further including the steps of:

positioning a tubular guide member inside of the MWD tool for guiding the radioactive sources to their respective operating positions within the MWD tool;

returning the upper end and lower radiation shields to the upper end of the MWD tool as well as within the MWD tool above the tubular guide member for respectively positioning the radiation shields to reinstall the radioactive sources within the MWD tool as well as tandemly coupling the tubular guide member to the lower end of the lower radiation shield;

moving the radioactive sources out of the radiation shields and through the tubular guide member for reinstalling the radioactive sources in their respective operating positions within the MWD tool; and once the radioactive sources have been reinstalled within the MWD tool, removing the upper and lower radiation shields as well as the tubular guide member from the MWD tool.

20. The method of claim 16 further including the steps of:

returning the radiation shields and radioactive sources to the upper end of the MWD tool as well as the interior thereof for positioning them to reinstall the radioactive sources in the MWD tool;

moving the radioactive sources out of the radiation shields and into the MWD tool for reinstalling the radioactive sources in the MWD tool; and once the radioactive sources have been reinstalled in the MWD tool, removing the radiation shields from the MWD tool.

21. Apparatus for handling a chemical radioactive source which is movably disposed within a tubular well tool body and comprising:

a tubular radiation shield cooperatively arranged for mounting adjacent to one end of a tubular well tool body and having an axial bore sized for receiving a chemical radioactive source movably disposed in that well tool body;

means cooperatively arranged for passage through said axial bore and on into a tubular well tool body and for releasably tandemly coupling onto a chemical radioactive source movably disposed in that well tool body upon movement through said radiation shield and on into that well tool body and for carrying that radioactive source into said radiation shield upon movement in the opposite direction; and means cooperatively arranged on said radiation shield for securing a radioactive source disposed therein.

22. The apparatus of claim 21 wherein said radiation shield is cooperatively sized and arranged to enter the one end of that well tool body and be mounted therein so that said movement of that radioactive source will enclose it within said radiation shield before it leaves that well tool body.

23. The apparatus of claim 21 wherein said radiation shield is cooperatively sized and arranged to be mounted on the one end of that well tool body so that said movement of that radioactive source will enclose it within said radiation shield as it leaves that well tool body.

24. Apparatus for handling tandemly-coupled chemical radioactive sources which are movably disposed within a tubular well tool body and comprising:

a first tubular radiation shield cooperatively arranged for mounting on one end of a tubular well tool body and having an axial bore cooperatively sized for receiving a first chemical radioactive source movably disposed in that well tool body;

a second tubular radiation shield cooperatively arranged for mounting in that one end of that well tool body and having an axial bore cooperatively sized for receiving a second chemical radioactive source movably disposed in that well tool body;

means cooperatively arranged for passage through said axial bores of said first and second radiation shields and on into a tubular well tool body and for tandemly coupling onto a first chemical radioactive source that is movably disposed in that well tool body and tandemly coupled to a second radioactive source therebelow and for carrying that first radioactive source through said second radiation shield out of that well tool body and into said first radiation shield and simultaneously carrying that second radioactive source into said second radiation shield;

and means cooperatively arranged on said radiation shield for securing at least one radiation source therein.

25. The apparatus of claim 24 further including:

a tubular guide member cooperatively arranged for mounting in that one end of that well tool body and having an axial bore cooperatively arranged for passage of those first and second radioactive sources as those radioactive sources are moved on into that well tool body.

26. The apparatus of claim 25 further including:

means cooperatively arranged on said second radiation shield for tandemly coupling said second radiation shield to said tubular guide member for carrying said tubular guide member out of that well tool body upon said movement in the opposite direction.

27. The apparatus of claim 24 further including: means tandemly coupling said first and second radiation shields together.

28. The apparatus of claim 27 wherein said means tandemly coupling said radiation shields together includes a third tubular radiation shield.

29. A method for handling a radioactive source of a well logging tool incorporated in the drillstring, said method comprising the steps of:

a. positioning a tubular radiation shield with its longitudinal axis substantially in alignment with the longitudinal axis of said drillstring;

b. moving said source between a first and a second position by translating said source in a direction generally parallel to said longitudinal axis, one of said first and second positions being the source's operative position in said tool and the other of said first and second positions being the source's shielded position in said shield.

30. The method as defined in claim 29 wherein said step of moving said source includes the step of engaging said source at one end thereof with a manipulating device and moving at least a portion of said manipulating device longitudinally through said shield.

31. The method as defined in claim 30 wherein said drillstring is stuck in the earth's surface, said method further including the steps of lowering a source manipulating device through said tubular shield by means of a longitudinally extending element, engaging said source with said manipulating device and withdrawing said longitudinally extending element through said tubular shield until said source is within said shield.

32. The method as defined in claim 29 wherein said logging tool and drill string are suspended below a drilling rig floor, said method further including the step of, prior to the step of moving said source, positioning said logging tool in a position sufficiently distant from said drilling rig floor so as to avoid a hazardous radiation condition at said drilling rig floor when said source is in its operative position in the tool.

33. The method as defined in claim 32 wherein said step of positioning said shield in alignment with said tool includes the step of inserting a portion of one of the shield and the drillstring into the other of the shield and the drillstring.

34. The method as defined in claim 29 further including the step of placing said tubular shield into a transportation shield after said source has been moved into said tubular shield.

35. Apparatus for handling a radioactive source useful in borehole logging operations conducted from a drillstring, said apparatus comprising:

a. a tubular shield having a passage longitudinally extending from one end to the other end of said shield;

b. a longitudinally extending manipulating device for engaging said source and for translating said source by longitudinal movement of said manipulating device through said longitudinally extending passage in said tubular shield.

36. The apparatus as defined in claim 35 wherein one end of said tubular shield is configured to couple axially with said drillstring.

37. The apparatus as defined in claim 35 wherein the source to be handled is a two part source having radioactive material at longitudinally separated, interconnected positions, said shield including first and second tubular shields connected to one another by an interconnecting member.

* * * * *